Nov. 9, 1954     J. A. TAPLESHAY ET AL     2,694,042
METHOD OF HUMIDIFYING AN AERIFORM BODY
SUPPLIED TO DIFFUSION MEDIA
Filed Aug. 25, 1951

Inventors,
John A. Tapleshay
and Carl H. Nordell
By: Schneider & Dressler
Attys.

United States Patent Office

2,694,042
Patented Nov. 9, 1954

2,694,042

METHOD OF HUMIDIFYING AN AERIFORM BODY SUPPLIED TO DIFFUSION MEDIA

John A. Tapleshay, Chicago, Ill., and Carl H. Nordell, Palm Springs, Calif., assignors to Chicago Pump Company, a corporation of Delaware Application August 25, 1951, Serial No. 243,702

11 Claims. (Cl. 210—2)

This invention relates to a method of humidifying air or other aeriform body which is supplied to a porous diffusing media used for the aeration of a liquid or the dispersion of gases or vapors therein. By humidifying air or other aeriform body in accordance with the present invention, the pores of the diffusing elements are kept clean so that the diffusing elements can operate for long periods of time without loss of efficiency and without the need for frequent cleaning.

In the activated sludge process of treating sewage, ore flotation processes, treatment of industrial wastes, various fermentation processes—for examples, the manufacture of yeast and penicillin, and certain other chemical processes where gas-liquid contact is essential, diffusing media are employed. These diffusers may be porous ceramic tubes or plates, cord-wound tubes of the type disclosed in Nordell Patent No. 2,555,201 or other suitable porous elements. Particularly when these diffuser elements are employed in the activated sludge process of treating sewage, with a diffuser element is positioned in a body of sewage it tends to become clogged by organic and inorganic suspended matter and matter in solution which is carried into the pores of the diffuser from the body of the sewage. This foreign matter is often very sticky and gummy and quickly clogs the pores of the diffuser element, thus greatly reducing the efficiency thereof and at times even completely preventing its use. This clogging frequently necessitates an expensive cleaning operation, and quite often the diffuser elements must be replaced with new elements, either because the elements cannot be cleaned so as to restore their efficiency or because it may not be economically feasible to clean them.

It appears that the diffusing elements are clogged primarily from the outside, sewage apparently entering the pores of the diffuser primarily because of capillary action. As the liquid enters the pores, air passing outwardly through the pores will cause the liquid to evaporate and as the liquid evaporates, the foreign material carried thereby is deposited in the diffuser. Evaporation allows further capillary action to take place and this becomes a continuous process, deposition of solid matter becoming greater and greater. In addition to the capillary action, hydrostatic pressure also forces some water containing dissolved and suspended material into the diffuser.

Our invention contemplates the addition of moisture to the air which is forced through the diffuser, to prevent clogging of the pores. The moisture in the air eliminates clogging by preventing evaporation in the diffuser. The moisture also aids in carrying solid matter out of the tube.

In our process, the air is, preferably, first heated. Moisture is then added to the heated air and the heated and humidified air is then passed through a main, through the diffuser element, and into the body of sewage. The air cools as it passes through the main so that the temperature of the air as it passes through the diffuser is substantially below the temperature to which it was heated. In our preferred operation, moisture is added to the heated air in such an amount that it saturates the air at the lower temperature of discharge through the diffuser.

In our process, the moisture which is added to the heated air is evaporated into the air as distinct from being entrained therein. By evaporating moisture into heated air, an amount of moisture sufficient to saturate the air at the lower temperature at the point of discharge can be added more economically and with greater ease than if the air were not first heated. Furthermore, heating allows the moisture to be added to but a portion of the air and the humidified portion can be mixed with the nonhumidified portion; by humidifying but a portion of the air the costs of humidification are reduced.

Other advantages inherent in our humidifying process for accomplishing this humidification will be described more fully in the following specification taken in conjunction with the accompanying drawings, in which.

Figure 1:
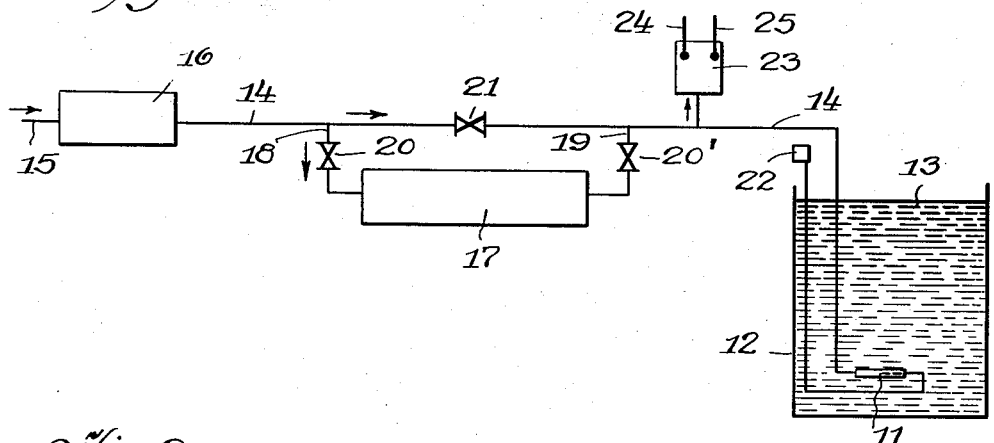
Figure 1 is a schematic representation of the apparatus used in the process of the present invention.

Referring to the drawings, a diffuser element 11, such as a ceramic or cord wound diffuser tube or other form of diffuser element, is positioned in an aeration tank 12 containing a quantity of sewage 13. The diffuser 11 may be used to aerate or gas-infuse any liquid other than sewage but for the purposes of this description, our process and apparatus will be described in conjunction with the aeration of a body of sewage. Diffuser 11 is connected to an air main 14. Circumambient air enters the main at a point indicated at 15 (Fig. 1) and is drawn in to a blower 16.

Blower 16 forces air through main 14 and also heats the air to a temperature greater than the temperature of the air entering the main at 15. A humidifier 17 is connected to air main 14 by means of an inlet pipe 18 and an outlet pipe 19. As will be seen from Fig. 1, humidifier 17 is connected to main 14 on the high pressure side of blower 16. A valve 20 in inlet pipe 18, another valve 20′ in outlet pipe 19 and a bypass valve 21 in the air main between valves 20 and 20′ control the amount of air which will pass through humidifier 17.

A thermometer 22 records the temperature of the air passing through diffuser 11 and a humidity indicator 23 makes it possible to determine the amount of moisture which should be added to the circumambient air to saturate that air at the temperature of discharge, that is, the temperature as recorded by thermometer 22. Humidity indicator 23 is positioned in air main 14 to sample a quantity of the air after it has passed through humidifier 17.

The humidity indicator is of conventional construction. It is maintained at a constant temperature by means of a thermo-regulator and has a dry bulb thermometer 24 therein to indicate this constant temperature. The humidity indicator also contains a wet bulb thermometer 25 and the difference in readings between the wet bulb thermometer and dry bulb thermometer enables the humidity of the air passing through the humidity indicator to be readily calculated. These humidity determinations can be easily determined by referring to a standard psychrometric chart and the method of calculating the amount of moisture which must be added does not constitute a part of the present invention. After it has been determined how much moisture is necessary to achieve saturation at the discharge temperature the amount of moisture to be added is controlled by operation of valves 20, 20′ and 21. If the humidity drops too low, valve 21 is closed to the extent necessary and valves 20 and 20′ are opened as necessary to allow more air to pass through the humidifier 17. If the humidity becomes too great, valve 21 is opened and valves 20 and 20′ are closed to prevent the air from flowing through the humidifier.

Heated air passing through air main 14 will enter a humidifying chamber 26 if valve 20 in air inlet pipe 18 is opened. The heated air is humidified in chamber 26 and outlet pipe 19 carries the humidified air past valve 20′ back to air main 14. If bypass valve 21 is kept partially open, a portion of the heated air will flow directly through the air main and will be mixed with the humidified air emerging from outlet 19. Heating the air in advance of humidification allows a greater quantity of moisture to be added to a smaller amount of air. The mixing of water and heated air is advantageous because a smaller and less expensive humidifier can be used if only a portion of the air is humidified.

The air which emerges from the blower travels at a high rate of speed and is slowed down considerably as it passes through the humidifier, for example from 2400 feet per minute to 400 feet per minute. This slowing down of the air stream enables the humidifier to evaporate moisture into the air, as distinct from merely entraining moisture therein, and allows a large quantity of moisture to be quickly and easily evaporated into the air.

Figure 2:
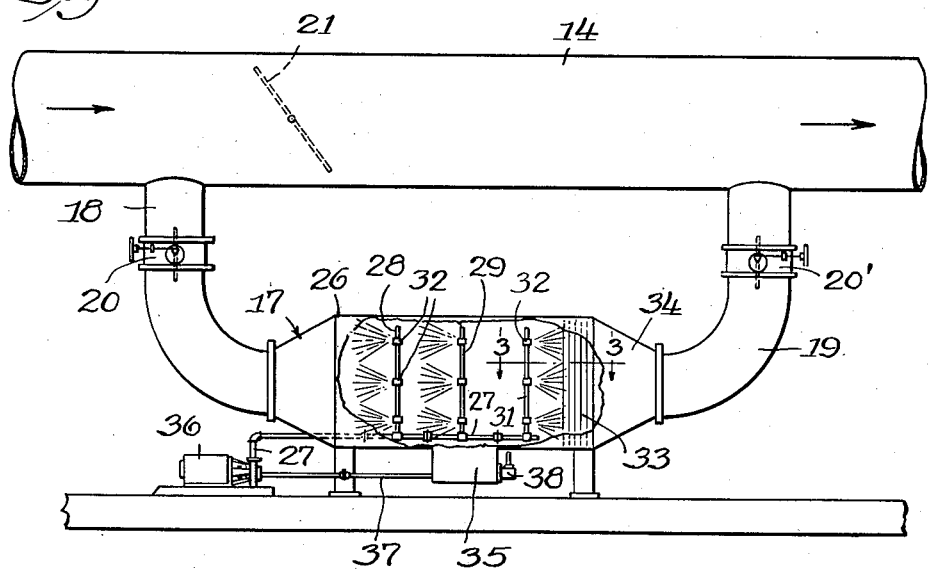
Fig. 2 is a side elevational view of the humidifier with a side wall of the humidification chamber broken away to show the interior structure.
Figure 3:
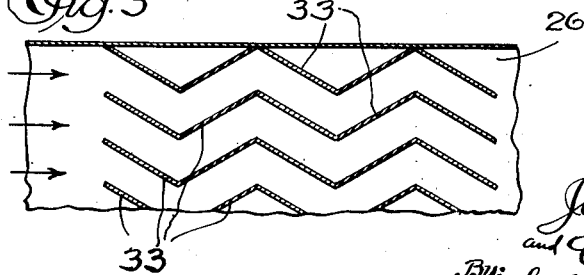
Fig. 3 is an enlarged sectional view taken along line 3—3 of Fig. 2 showing the baffles at the outlet end of the humidification chamber.

A water inlet pipe 27 supplies a flow of water to the interior of the humdifier. Standpipes 28, 29 and 31 extend upwardly from water pipe 27 and each standpipe has a plurality of nozzles 32 thereon. As shown in Fig. 2, nozzles 32 on standpipes 28 and 29 spray a fine mist in a direction opposed to the incoming air and a quantity of moisture is evaporated into the air. Standpipe 31 sprays a fine mist in the same direction as the air flow against a plurality of baffles 33 positioned adjacent the outlet end 34 of the humidifying chamber. Baffles 33 form a tortuous passageway for the mist sprayed by standpipe 31 and enable a further quantity of moisture to be evaporated into the air. There may be any number of standpipes which operate against the direction of the incoming air and any number which operate in the direction of the air. However, it is advisable to have at least one standpipe with its associated nozzles facing in each direction.

Water which is not evaporated falls to the bottom of humidifying chamber 26 and into a well 35 at the bottom of the chamber. A circulating pump 36 withdraws water from well 35 through outlet pipe 37 and recirculates this water back through water pipe 27. When the amount of water in well 35 drops too low, a float valve or other suitable device (not shown) operates to bring more water into well 35 through line 38.

Any type of blower 16 known to the art may be used in our process. In actual practice, the heat of compression of the blower raises the temperature of the circumambient air about 40° to 80° F. The temperature of the circumabient air drawn into the blower usually fairly closely approximates the temperature of the air as it is discharged through the diffuser, so that the 40° to 80° F. rise is usually sufficient to allow enough moisture to be added to the circumambient air to easily saturate that air at the point of discharge. As an illustration of our process, assume the following conditions:

Temperature of circumambient air_____ 40° F.
Relative humidity of circumambient air__50%.
Pressure of discharged air_____ 5.0 lbs. p. s. i.
Temperature of blower discharged air___ 100° F.
Temperature of discharged air at point of discharge _____ 55° F.

From a standard psychrometric chart, it is determined that air at 40° F. and 50% relative humidity has a moisture content of 18.2 grains per lb. of dry air. Again referring to a psychrometric chart, at 5.0 lbs. per square inch of gauge pressure, the saturation point of air at 55° F. (the discharge temperature) is 47.0 grains of moisture per lb. of dry air. It is therefore necessary to add 28.8 grains of moisture per lb. of dry air from the humidifier to saturate the air at a discharge temperature of 55° F. A psychrometric curve will readily indicate the wet bulb temperature corresponding to this amount of moisture, and heated air is passed through the humidifier in an amount sufficient to give the determined wet bulb temperature on wet bulb 25 in humidity regulator 23. If the wet bulb temperature drops below the determined value, more air can be passed through the humidifier 17 by means of control valves 20, 20′ and 21. If the wet bulb temperature becomes too high, the air supply passing through the humidifier is reduced.

The optimum amount of moisture evaporated into the air is that amount which gives saturation at the discharge temperature. As the heated air moves through air main 14, it becomes cooled and it is desired to have the air saturated as it emerges from diffuser 11. Saturated air cannot absorb moisture in diffuser 11 and no evaporation can take place. The saturation point is not critical, however. Very little evaporation will take place if the air is slightly undersaturated. The air may also be slightly supersaturated. Actually it may be desirable to have a small amount of condensation take place in diffuser 11 although a great amount of condensation requires too much pressure to force the air through the diffuser. It is for this reason that the water is evaporated rather than entrained in the air stream. With entrainment, too much condensation in the diffuser will take place.

In our process, as above described, the air is humidified after it passes through the blower. The air can also be humidified before it enters the blower but this requires additional heating means in advance of the blower with consequent additional expense. This disadvantage however, is somewhat offset by the fact that the humidifier would not have to be placed in the high pressure line. Furthermore, instead of using a humidifier of the type herein described, the air may be humidified by injecting steam into the air main after the air has passed through the blower.

We have found that our process of humidifying circumambient air by raising the temperature of the circumambient air, and humidifying the heated air in an amount sufficient to saturate the air at the discharge temperature, effectively prevents clogging of the pores of a diffuser element. However, to further prevent any possible clogging, it may be advisable to periodically inject, by entrainment, a fine mist or spray of a solution of water and a detergent, preferably an alkyl sulfate or alkyl sulfonate type detergent in admixture with sodium tripolyphosphate. This entrainment is preferably made at a point just before the air enters the diffuser so that large droplets of the detergent solution will not condense in the tube. The detergent mist or spray aids in cleaning the pores of the diffuser as it passes therethrough. A non-sudsing type of detergent is preferred to prevent an accumulation of foam in the aeration tank. It is also preferable to use soft water to prevent an accumulation of hard water salts in the pores of the tube. If soft water is not available, there should be mixed with the water a small quantity of a calcium and magnesium sequestering agent such as sodium hexametaphosphate (Calgon) or sodium tripolyphosphate.

Although we have described our process and apparatus in considerable detail, it is to be understood that the description is intended to be illustrative rather than restrictive and that modifications may be made without departing from the spirit or scope of the invention.

We claim:

1. A process for treating a liquid by passing an aeriform body through a porous diffuser element positioned in said liquid, said process comprising passing the aeriform body through a passageway leading to said diffuser element, evaporating a quantity of moisture into said aeriform body during its passage through said passageway, the amount of water evaporated into said aeriform body being sufficient to saturate the aeriform body at substantially its temperature at the point of discharge, and then passing the humidified aeriform body through said diffuser element and into the liquid.

2. A process for treating a liquid by passing an aeriform body through a porous diffuser element positioned in said liquid, wherein the aeriform body conducted to the diffuser element has a temperature higher than the temperature of the aeriform body as it discharges from the diffuser element, comprising conducting an aeriform body at a relatively high temperature to the diffuser element, evaporating a quantity of moisture into said aeriform body as it passes to said diffuser element, the quantity of moisture evaporated into the aeriform body being sufficient to saturate the aeriform body at substantially its temperature at the point of discharge, and then passing said humidified aeriform body at a relatively low temperature through the diffuser element and into the liquid.

3. A process for treating a liquid by passing an aeriform body through a porous diffuser element positioned in said liquid, said process comprising passing the aeriform body under pressure through a passageway leading to said diffuser element, heating said aeriform body, evaporating a quantity of moisture into a portion of said heated aeriform body during its passage through said passageway to humidify a portion of said aeriform body, mixing said humidified portion with the unhumidified portion of said aeriform body, the amount of water evaporated into said aeriform body being sufficient to saturate said aeriform body at substantially its temperature at the point of discharge, cooling said humidified aeriform body, and then passing the humidified aeriform body through said diffuser element and into the liquid.

4. A process for treating a liquid by passing an aeriform body through a porous diffuser element positioned in said liquid, said process comprising passing the aeriform body under pressure through a passageway leading to said diffuser element, heating said aeriform body, evaporating a quantity of moisture into said heated aeriform body during its passage through said passageway, the amount of water evaporated into said aeriform body being sufficient to saturate said aeriform body at substantially its temperature at the point of discharge, cooling said humidified aeriform body, and then passing the humidified aeriform body through said diffuser element and into the liquid.

5. A process for treating a liquid by passing an aeriform body through a porous diffuser element positioned in said liquid, said process comprising passing the aeriform body under pressure through a passageway leading to said diffuser element, heating said aeriform body, evaporating a quantity of moisture into said heated aeriform body while the same is under pressure, the amount of water evaporated into said aeriform body being sufficient to saturate said aeriform body at substantially its temperature at the point of discharge, cooling said humidified aeriform body, and then passing the humidified aeriform body through said diffuser element and into the liquid.

6. A process for treating a liquid by passing an aeriform body through a porous diffuser element positioned in said liquid, said process comprising passing the aeriform body through a passageway leading to said diffuser element, adding steam to said aeriform body during its passage through said passageway in an amount sufficient to saturate said aeriform body with water vapor at substantially its temperature at the point of discharge, and then passing the humidified aeriform body through said diffuser element and into the liquid.

7. A process for treating a liquid by passing an aeriform body through a porous diffuser element positioned in said liquid, said process comprising passing the aeriform body under pressure through a passageway leading to said diffuser element, heating said aeriform body, adding steam to said heated aeriform body in an amount sufficient to saturate said aeriform body with water vapor at substantially its temperature at the point of discharge, cooling said humidified aeriform body, and then passing the humidified aeriform body through said diffuser element and into the liquid.

8. A process for treating a liquid by passing an aeriform body through a porous diffuser element positioned in said liquid, said process comprising passing the aeriform body through a passageway leading to said diffuser element, evaporating a quantity of moisture into said aeriform body during its passage through said passageway, the amount of water evaporated into said aeriform body being sufficient to saturate the aeriform body at substantially its temperature at the point of discharge, entraining a detergent solution in said humidified aeriform body, and then passing the humidified detergent-treated aeriform body through said diffuser element and into the liquid.

9. A process for treating a liquid by passing an aeriform body through a porous diffuser element positioned in said liquid, said process comprising passing the aeriform body under pressure through a passageway leading to said diffuser element, heating said aeriform body, evaporating a quantity of moisture into said heated aeriform body during its passage through said passageway, the amount of water evaporated into said aeriform body being sufficient to saturate said aeriform body at substantially its temperature at the point of discharge, cooling said humidified aeriform body, entraining a detergent solution in said humidified aeriform body, and then passing the humidified detergent-treated aeriform body through said diffuser element and into the liquid.

10. A process for treating a liquid by passing air through a porous diffuser element positioned in said liquid, said process comprising heating the air to a temperature greater than the temperature of the air at the point of discharge through said diffuser element, passing a portion of said heated air through a fine spray of water to evaporate water into said portion of heated air, mixing said humidified portion of heated air with the unhumidified portion of heated air, the amount of water added to the heated air being sufficient to saturate said air at substantially its temperature at said point of discharge, cooling said humidified air, and then passing said humidified air through said diffuser element and into the liquid.

11. A process for treating a liquid by passing an aeriform body through a porous diffuser element positioned in said liquid, said process comprising passing the aeriform body under pressure and in a heated state through a passageway leading to said diffuser element, evaporating a quantity of moisture into a portion of said heated aeriform body during its passage through said passageway to humidify a portion of said aeriform body, mixing said humidified portion with the unhumidified portion of said aeriform body, the amount of water evaporated into said body being sufficient to saturate said aeriform body at substantially its temperature at the point of discharge, cooling said humidified aeriform body, and then passing the humidified aeriform body through said diffuser element and into the liquid.

References Cited in the file of this patent

UNITED STATES PATENTS

| Number | Name | Date |
|---|---|---|
| 1,223,082 | Lissauer | Apr. 17, 1917 |
| 1,400,308 | Mottaf | Dec. 13, 1921 |
| 1,646,243 | Handelan | Oct. 18, 1927 |
| 1,803,315 | Breer | May 5, 1931 |
| 1,950,900 | McConnell | Mar. 13, 1934 |
| 2,187,905 | Killingsworth | Jan. 23, 1940 |